United States Patent

Hikita

[11] Patent Number: 4,693,329
[45] Date of Patent: Sep. 15, 1987

[54] ELECTONIC SCALE WITH LABEL CHARACTER SIZE CHANGE CAPABILITY

[75] Inventor: Michiyasu Hikita, Kusatsu, Japan

[73] Assignee: Kabushiki Kaisha Ishida Koki Seisakusho, Kyoto, Japan

[21] Appl. No.: 676,243

[22] Filed: Nov. 29, 1984

[30] Foreign Application Priority Data

Nov. 29, 1983 [JP] Japan ................. 58-225174

[51] Int. Cl.⁴ .............. G01G 23/38; G01G 23/22; G01D 9/00
[52] U.S. Cl. ........................ 177/4; 177/25; 346/9; 364/466
[58] Field of Search .......... 177/4, 25; 346/14 R, 346/17, 9; 358/298; 364/466

[56] References Cited

U.S. PATENT DOCUMENTS

| | | | |
|---|---|---|---|
| 4,125,843 | 11/1978 | Whitby | 346/17 |
| 4,229,794 | 10/1980 | Foster | 364/466 |
| 4,394,693 | 7/1983 | Shirley | 358/298 |
| 4,398,253 | 8/1983 | Karp et al. | 177/4 X |
| 4,423,486 | 12/1983 | Berner | 364/466 |
| 4,430,716 | 2/1984 | Dlugos et al. | 177/25 X |
| 4,440,248 | 4/1984 | Teraoka | 177/4 |
| 4,481,587 | 11/1984 | Daniels, Jr. | 177/25 X |
| 4,499,545 | 2/1985 | Daniels et al. | 177/25 X |
| 4,544,929 | 10/1985 | Lemelson | 346/9 |

Primary Examiner—George H. Miller, Jr.
Attorney, Agent, or Firm—Staas & Halsey

[57] ABSTRACT

An electronic scale for weighing an article and displaying and/or printing the weight, price and other data of the article. The scale includes a key input unit for registering and recalling article data. The key input unit has preset keys indicating article names, alphabetical letters, and other indicia. The keys are operated to register and recalling article names and other data which are used frequently.

6 Claims, 27 Drawing Figures

EXAMPLE OF PRINTED LABEL

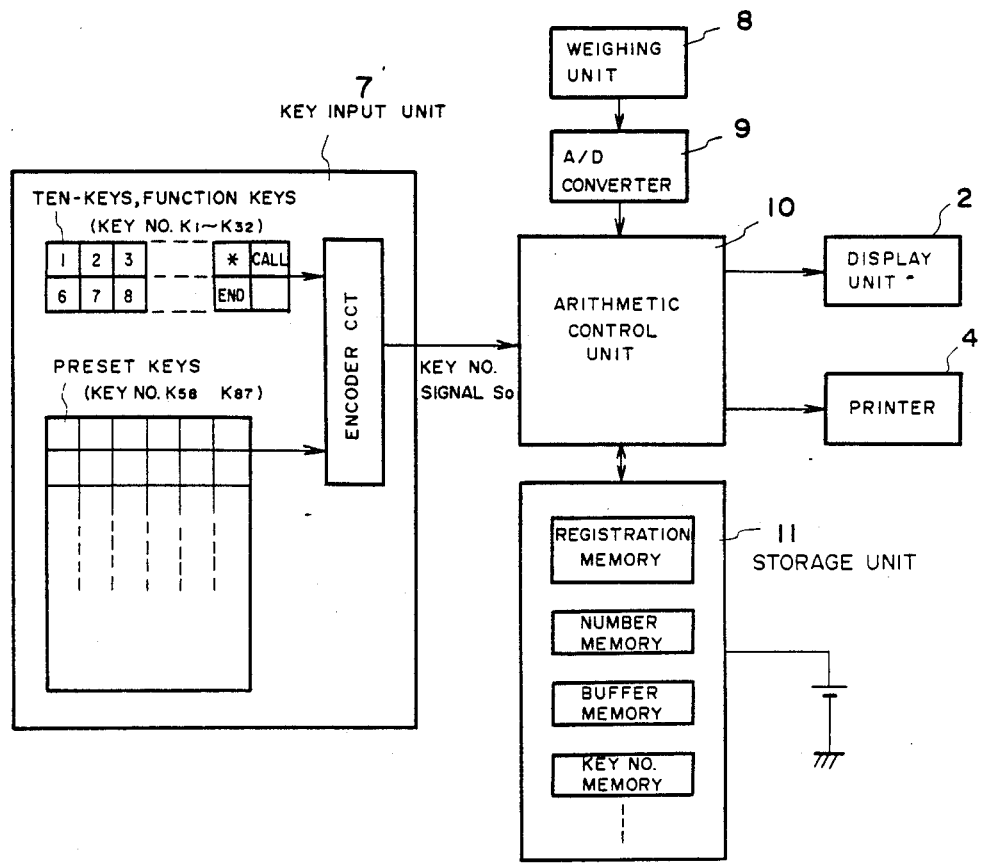

Fig. 4

| CALL NO. | ARTICLE CODE | CHARACTER CODE FOR ARTICLE | | | | UNIT PRICE |
|---|---|---|---|---|---|---|
| 001 | 120011 | 1248 | 1277 | 1291 | ---- 4567 | 489 |
| 002 | 120023 | 1211 | 1456 | 1892 | ---- 6898 | 725 |
| 003 | 120045 | 1213 | 1578 | 9977 | ---- 1123 | 68 |

Fig. 5

| KANJI LETTER | KATAKANA LETTER | KANJI FOR "BEEF" / BLANK | KANJI FOR "PORK" / KATAKANA FOR "A" | KANJI FOR "CHICKEN" / KATAKANA FOR "I" | KANJI FOR "NET" / KATAKANA FOR "U" |
|---|---|---|---|---|---|
| K33 | K34 | K35 | K36 | K37 | K38 |
| KANJI FOR "MEAT" / KATAKANA FOR "E" | KANJI FOR "ROAST" / KATAKANA FOR "O" | KANJI FOR "FOR" / KATAKANA FOR "KA" | KANJI FOR "BEST" / KATAKANA FOR "KI" | KANJI FOR "MEDIUM" / KATAKANA FOR "KU" | KANJI FOR "AVERAGE" / KATAKANA FOR "KE" |
| K39 | K40 | K41 | K42 | K43 | K44 |
| K45 ~ K87 | | | | | |

Fig. 6

| LETTERS FOR "BEEF ROAST" | LETTERS FOR "BEEF SUKIYAKI" | LETTERS FOR "BEEF MINCE" | | | |
|---|---|---|---|---|---|
| K33 | K34 | K35 | K36 | K37 | K38 |

| SHEET 1 | — | — | — | KANJI FOR "BEEF" | KANJI FOR "PORK" |
|---|---|---|---|---|---|
| K33 | K34 | K35 | K36 | K37 | K38 |
| KANJI FOR "CHICKEN" | KANJI FOR "NET" | KANJI FOR "MEAT" | KANJI FOR "ROAST" | KANJI FOR "FOR" | KANJI FOR "BEST" |
| K39 | K40 | K41 | K42 | K43 | K44 |

| SHEET 2 | — | — | — | KATAKANA FOR "A" | KATAKANA FOR "I" |
|---|---|---|---|---|---|
| K33 | K34 | K35 | K36 | K37 | K38 |
| KATAKANA FOR "U" | KATAKANA FOR "E" | KATAKANA FOR "O" | KATAKANA FOR "KA" | KATAKANA FOR "KI" | KATAKANA FOR "KU" |
| K39 | K40 | K41 | K42 | K43 | K44 |

| SHEET 3 | — | — | — | A | B |
|---|---|---|---|---|---|
| K33 | K34 | K35 | K36 | K37 | K38 |
| C | D | E | F | G | H |
| K39 | K40 | K41 | K42 | K43 | K44 |

| — | — | — | SHEET 4 | a | b |
|---|---|---|---|---|---|
| K33 | K34 | K35 | K36 | K37 | K38 |
| c | d | e | f | g | h |
| K39 | K40 | K41 | K42 | K43 | K44 |

DISPLAY EXAMPLES ON DISPLAY UNIT

| WEIGHT DISPLAY | UNIT PRICE DISPLAY | SUM MEMORY |
|---|---|---|
| CHARACTER COUNT MEMORY VALUE / SHIFT COUNT MEMORY VALUE | NUMBER MEMORY VALUE | MODE / TYPE COUNT MEMORY VALUE |

(1) WHEN ITEM REGISTRATION MODE IS SELECTED: [ ] [ 0 ] [ 0 - - - ]

(2) WHEN "12" IS ENTERED AS CALL NO.: [ ] [ 12 ] [ 0 - 1 - - ]

(3) WHEN "B" IS ENTERED: [ 1 - 0 ] [ 0 ] [ 0 - 1 - 3 ]

(4) WHEN "EEF, SP, C, 3, 0, 1" IS ENTERED: [ 5 - 0 ] [ 301 ] [ 0 - 1 - 3 ]

(5) WHEN "⏎ NEW LINE, SHIFT, SHIFT" IS ENTERED: [ 6 - 2 ] [ 0 ] [ 0 - 1 - 3 ]

(6) WHEN "T" IS ENTERED: [ 7 - 2 ] [ 0 ] [ 0 - 1 . 3 ]

(7) WHEN "9999" IS ENTERED AS CALL NO. AND "SET" IS ENTERED: [ ] [ 0 ] [ 0 - 2 ]

Fig. 13

10 824530
BEEF ROUND
STEAK BONELESS 12 824537
BEEF ROUND
TIP ROAST 13 824538
BEEF ROUND
TIP ROAST CAP OFF 14 824539
BEEF ROUND
TIP STEAK 16 824540
BEEF ROUND
TIP STEAK CAP OFF 18 824541
BEEF ROUND
TOP ROUND ROAST 19 824542
BEEF ROUND
TOP ROUND STEAK 20 825530
PORK ROUND
STEAK BONELESS 22 825537
PORK ROUND
TIP ROAST 23 825538
PORK ROUND
TIP ROAST CAP OFF 24 825539
PORK ROUND
TIP STEAK 26 825540
PORK ROUND
TIP STEAK CAP OFF 28 825541
PORK ROUND
TIP ROUND ROAST 30 824630
BEEF ARM
STEAK BONELESS 32 824637
BEEF ARM
TIP ROAST 33 824638
BEEF ARM
TIP ROAST CAP OFF 34 824639
BEEF ARM
TIP STEAK 36 824640
BEEF ARM
TIP STEAK CAP OFF

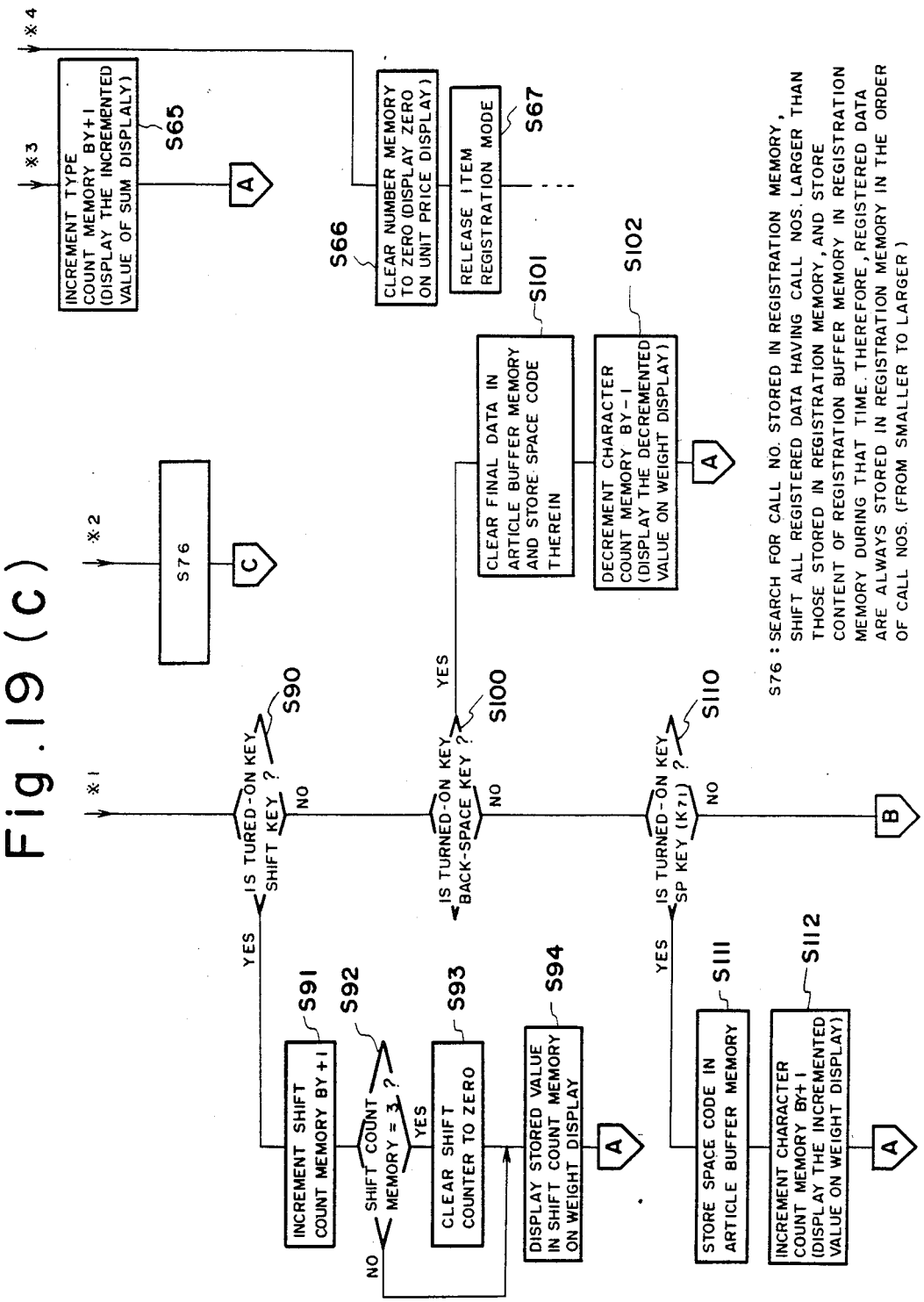

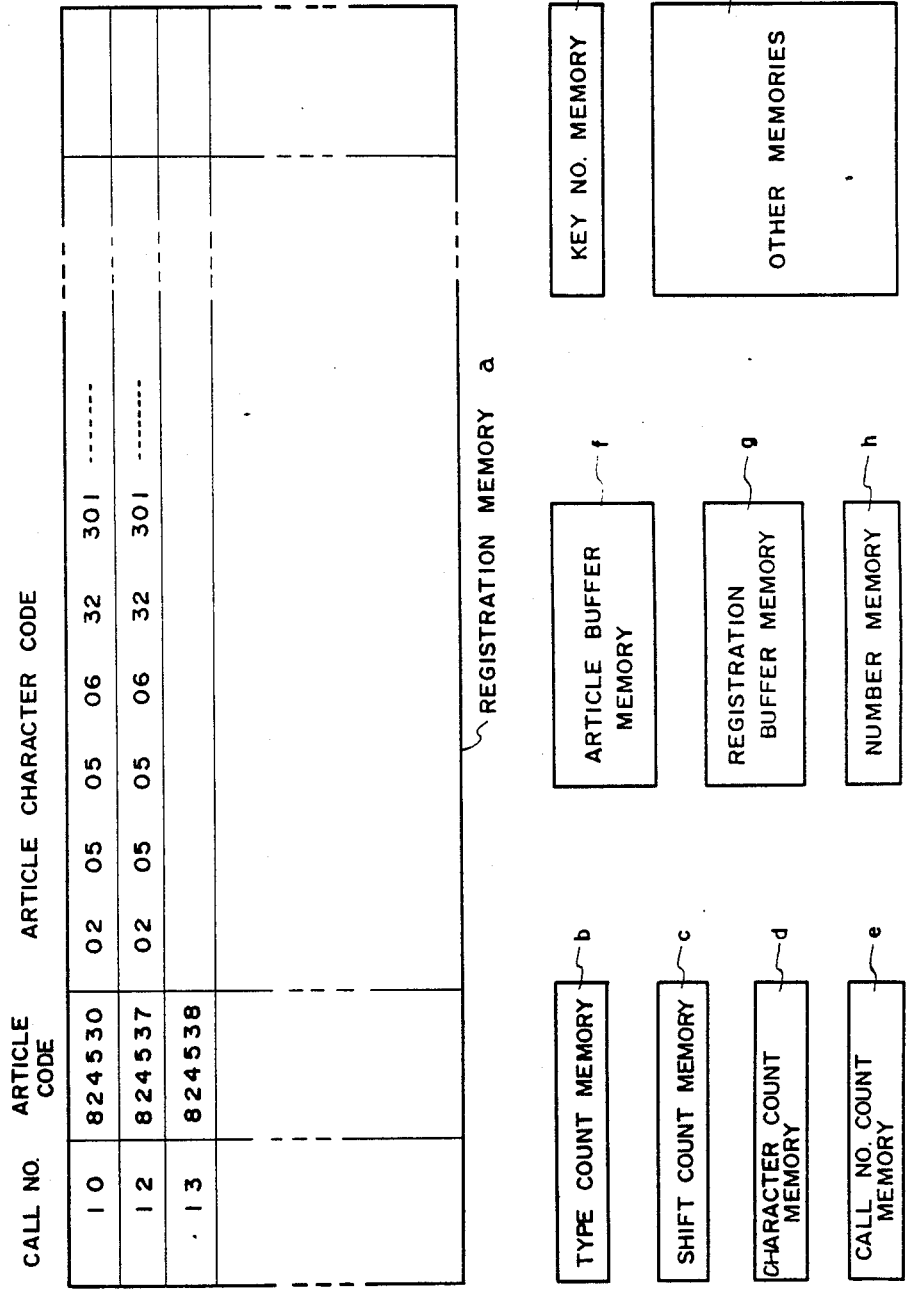

ical scale of the type described
ELECTONIC SCALE WITH LABEL CHARACTER SIZE CHANGE CAPABILITY

BACKGROUND OF THE INVENTION

The present invention relates to an electronic scale which stores article data, such as article names, unit prices, tares, etc., fetches stored article data in response to the depression of ten-keys or preset keys, and displays and prints such fetched article data.

Electronic scales generally operate by entering article data such as unit prices and tares into a control unit and storing them in response to actuation of a key-operated input unit such as a ten-key pad, fetching article data by entering a call number, and displaying the weight of a desired article and the unit price and price thereof. There have also been put to use many electronic scales having a printer for printing data such as an article name and date, in addition to the foregoing article data, on a label and issuing such a printed label.

FIG. 1 of the accompanying drawings illustrates, in perspective, an electronic scale of the type described above. When the article for sale is placed on a weighing pan or tray 1, a control unit contained in the scale effects an arithmetic operation based on a unit price and other data which have already been fetched in response to the entry of a call number by ten-keys 3, for and displays total price, a unit price, a weight, and other data on a display unit 2. The illustrated electronic scale has a printer 4 which prints the article name, date, unit price, total price, and other data, as shown in FIG. 3(b), on an unprinted label, as shown in FIG. 3(a).

FIG. 2 is a block diagram of the electronic scale shown in FIG. 1, for explaining the functions of the scale. The electronic scale includes a weighing unit 8, an A/D converter 9, an arithmetic control unit 10, a storage unit 11, a key-operated input unit 7, a display unit 2, and a printer 4. Article codes, article names, unit prices, and other necessary data are entered in advance through ten-keys and function keys in the key input unit 7, and are stored in a registration memory in the storage unit 11 under the control of the arithmetic control unit 10. The storage unit 11 includes a RAM and a ROM, as shown in FIGS. 21 and 15, respectively. When, an articles is placed on the weighing pan 1, the weight of the article is measured by the weighing unit 8. The measured weight (in analog representation) is converted by the A/D converter 9 into a digital signal, which is applied as weight data to the arithmetic control unit 10.

The arithmetic control unit 10 fetches necessary data on the article from the registration memory, effects an arithmetic operation on the fetched data and the weight data, and then displays data on the display unit 2 and controls the printer 4 to print the data on a label.

The data for each article is stored in the registration memory by operating the ten-keys to enter numbers. According to the conventional practice, entering the data through depression of keys has been time-consuming since article names are expressed by characters each composed of 4 numerals, as shown by stored examples in FIG. 4.

SUMMARY OF THE INVENTION

It is an object of the present invention to provide an electronic scale which can register and fetch article data through simple key operation effected in a shortened period of time.

Another object of the present invention is to provide an electronic scale capable of specifying three character sizes with a single key when printing registered data.

Still another object of the present invention is to provide an electronic scale capable of printing registered data in the order of call numbers.

A still further object of the present invention is to provide an electronic scale capable of counting and displaying the number of characters entered by keys as representing an article name.

According to the present invention, there is provided an electronic scale, comprising a weighing unit for weighing an article, an arithmetic control unit for computing a price based on weight data issued from the weighing unit, a storage unit for storing article data entered in the arithmetic control unit, a key input unit having keys for registering a character code such as an article name represented by one character corresponding to the article and for calling the registered character code, a display unit for displaying the weight and price of the weighed article which are issued from the arithmetic control unit, and a printer for printing on a label the weight, price, and name of the weighed article which are issued from the arithmetic control unit.

With the electronic scale of the present invention, only keys corresponding character codes may be operated upon registering and calling article names which are used highly frequently. Thus, the time required for actuating the keys can greatly be reduced, and the electronic scale can be operated upon with increased ease.

For printing registered data, three different character sizes can be specified by a single key, and registered data can be printed in the order of call numbers, so that the registered data can functionally be printed and so that printed data are is highly readable.

During the time that article name characters are being entered through keys the number of entered characters can be counted and displayed; accordingly, the operator can confirm how many characters have been used to article means.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 2 is a block diagram of the components of an electronic scale;

FIGS. 3(A) and 3(B) illustrate labels before and after printing, respectively;

FIG. 4 illustrates examples of article data stored in a registration memory in the electronic scale;

FIGS. 5 through 10 illustrate examples of sheets to be fitted over preset keys according to the present invention;

FIG. 12 illustrates an example of a displayed on a display unit;

FIG. 13 illustrates of an example of registered data printed as an item list;

FIG. 21 is a view illustrative of a RAM in the storage unit.

DESCRIPTION OF THE PREFERRED EMBODIMENTS

Figure 1:
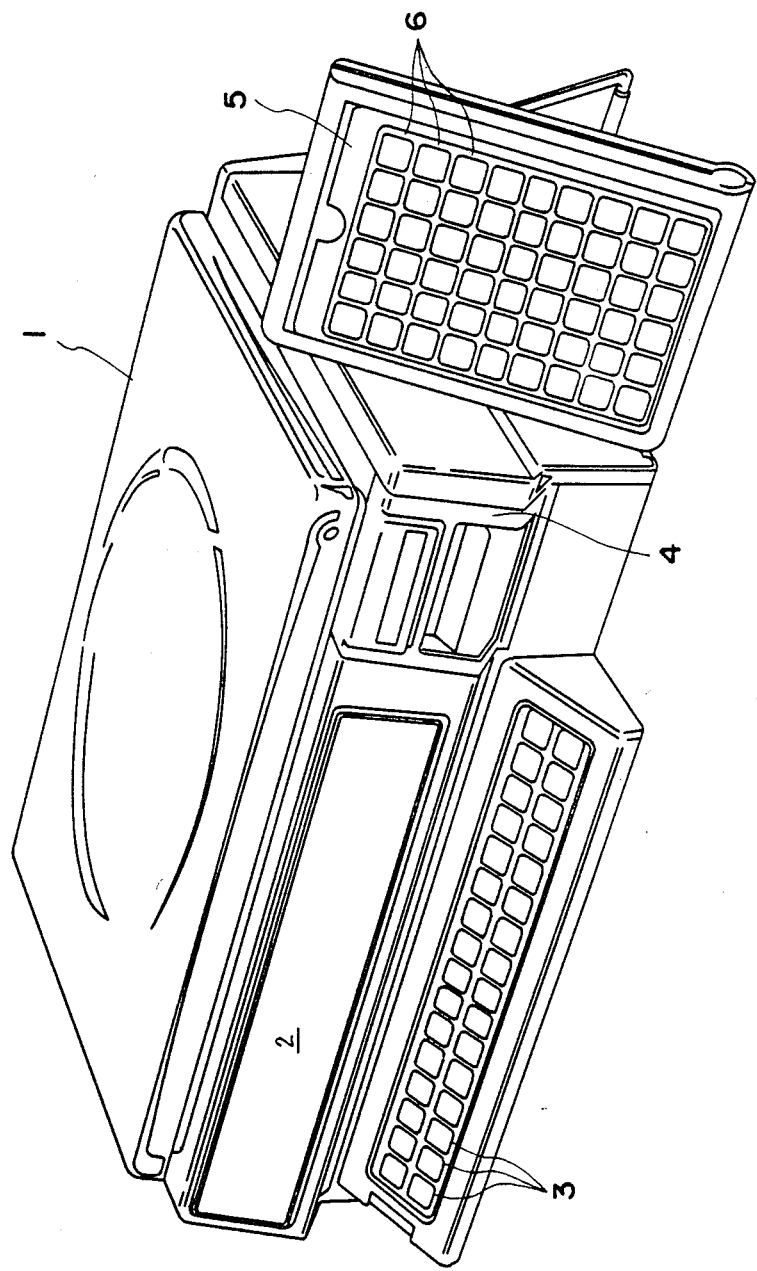
FIG. 1 is a perspective view of an electronic scale.

An electronic scale according to the present invention has preset keys 6 and ten-keys 20, as shown in FIG. 1, the preset keys 6, the ten-keys 20 and function keys which have been conventionally available, jointly constitute a key input unit 7, as shown in FIG. 2. The preset keys 6 are operated to register and call required data in accordance with a sheet 5 fitted over the keys and bearing article names and Kanji characters (Chinese characters) at respective keys. FIGS. 5 through 10 are illustrative of examples of such sheets. The illustrated example sheets also bear key numbers which are not present on actual sheets.

FIG. 5 shows a sheet for registering article names while switching between Kanji characters and Katakana characters (Japanese characters). For example, a key K33 is depressed to select a Kanji character mode, and then a key K36 is depressed to register a Kanji character meaning "pork". When a Katakana selection key K34 is depressed and then the key K36 is selected, a Katakana character for "a" is registered. FIG. 6 is a sheet for calling registered data, bearing character names which are frequently used, such as "beef roast", "beef sukiyaki" and others, associated with the respective keys. FIGS. 7 through 10 are illustrative of registration sheets for using Kanji characters, Katakana characters, upper-case alphabetical letters, and lower-case alphabetical letters, respectively. When key K33 corresponding to "sheet 1" is depressed and a key K38 is depressed, for example, a character meaning "pork" is registered. When the sheet of FIG. 8 is used and a key K34 for "sheet 2" is depressed following by depression of the key K38, then a Katakana character meaning "i" is registered. When the sheet of FIG. 9 is used and a key K35 corresponding to "sheet 3" is depressed and the key K38 is depressed, an upper-case alphabetical letter "B" is registered. When the sheet of FIG. 10 is employed and a key K36 corresponding to "sheet 4" is depressed, and subsequent to key K38 is depressed, a lower-case alphabetical letter "b" is registered.

With the electronic scale of the present invention, characters for article names can be registered by combining numerals, through ten-keys and preset keys in association with the sheets shown in FIGS. 5 and 7 through 10. Furthermore, article data can be fetched by entering call numbers of FIG. 4 through the ten-keys, and can also be fetched by entering article names using the sheet of FIG. 6. Where the call sheet is employed, the operator fits the call sheet over the preset keys, and puts the arithmetic control unit comprising a microcomputer or the like in a call mode. Then, the key K33 is depressed to select "beef roast", whereupon the arithmetic control unit reads data relating the beef roast such as the article code, the character code, and the unit price from the registration memory, and automatically sets such data. The call numbers and the preset key numbers are placed in a 1-to-1 correspondence such that the call number 001 corresponds to the preset key K33, the call number 002 to the preset key K34, and so on. Normally, there are 750 call numbers, from 001 through 750, which are available through the ten-keys. However, the preset keys are limited in number, that is, there are only 54 preset keys from K33 through K87. Therefore, the preset keys are made to correspond to highly frequently used call numbers as desired. For example, the call number 001 may correspond to the preset key K50.

Figure 11:
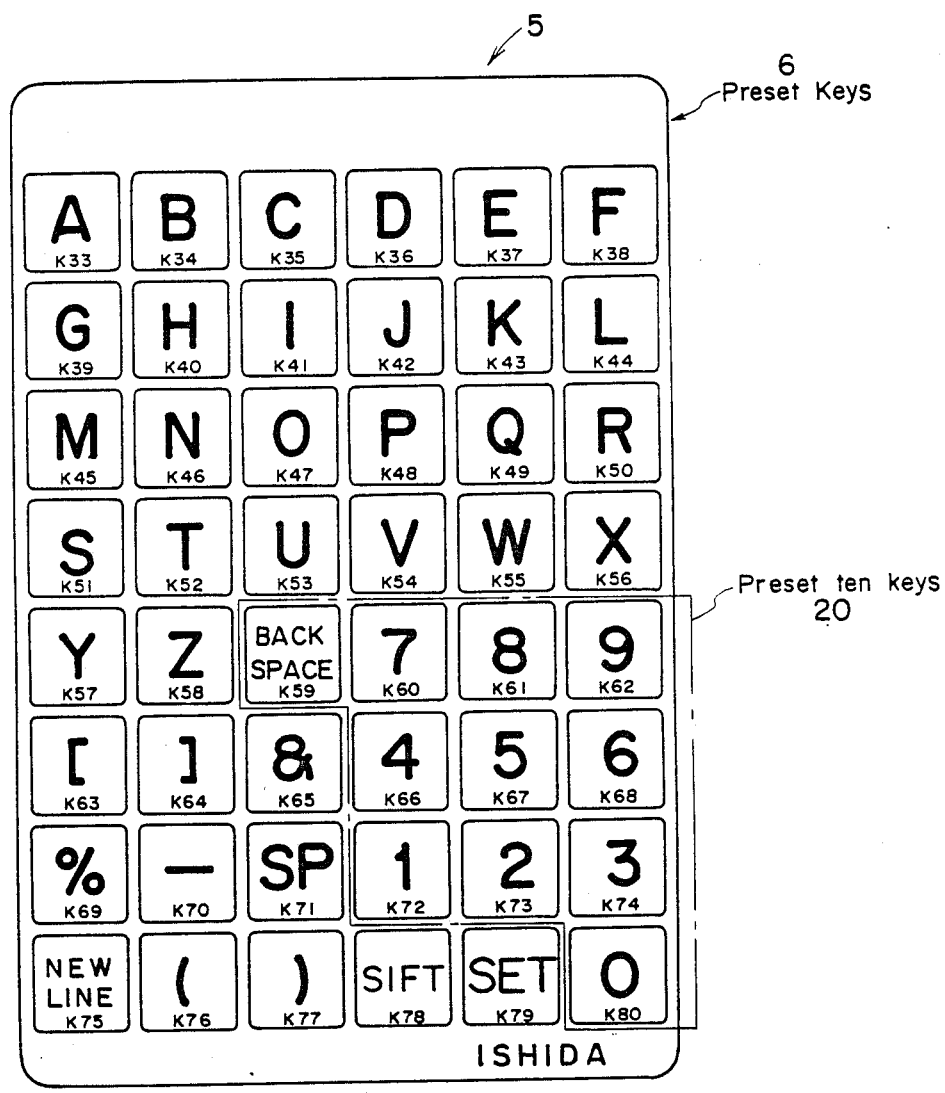
FIG. 11 illustrates a sheet to be fitted over preset keys when the preset keys are to be used as registration keys.

FIG. 11 shows a shet 5 to be fitted over the preset keys when the preset keys are used for registering data such as call numbers, article codes, and article names. In the illustrated embodiment, there are 48 preset keys from K33 to K80, including 31 character keys for A, B, C, ... Z, &, %, —, (, and), 11 preset ten-keys for 0, 1, 2, ... 9, and BACK SPACE, and 6 special keys for [,], SP, NEW LINE, SHIFT, and SET.

When entering call numbers, article codes, unit prices, and using the [,] keys, the 0, 1, ... 9 keys are used as numeral keys for 0, 1, ... 9, and the BACK SPACE key is used as a clear key. When entering article name characters (except when using the [,] keys), the 0, 1, ... 9 keys are used as character keys 0, 1, ... 9, and the BACK SPACE key is used as a back space key. That is, the 0 through 9 keys or the preset ten-keys are automatically switched to numerical/character keys when entering article names, and to numeral keys when entering numerical data. By using the sheet of FIG. 11, therefore, all data to be registered can be entered only with the preset keys having the key numbers K33 through K80.

The sheet 5 illustrated in FIG. 11 is used as follows:

(1) Where the order or sequence in which data to be registered on one article is entered is fixed, that is, the first data item is the call number, the second the article code, the third the article name, the fourth the unit price, for example, the operator depresses keys to enter the data in that sequence.

(2) When the preset keys 0 through 9 are turned on at the time of entering the first, second, and fourth data, the key number is converted into the numeral corresponding to the key number and the numeral is stored. For example, when key K74 for "3" is depressed, the key number 74 is converted into the numeral 3 which is stored.

(3) When the preset keys 0 through 9 are turned on at the time of entering the third article data, the key number is converted into corresponding character code which is then stored. For example, when the key 74 for "3" is depressed as part of an article name, the key number 74 is converted into the character code for 3 which is stored.

Thus, using the sheet of FIG. 11, numerical values can be entered without using the ten-keys K1 through K32 shown in FIG. 2.

When the shift key K78 is used, three character sizes can be specified by displaying the number of depressions of the shift key on a weight display shown in FIG. 12.

(1) Before the shift key is turned on, "0" is displayed on the weight display to specify large-size characters.

For example, when turning on the "A" key, it is converted into a large-size character code for "A".

(2) When the shift key is turned on once, "1" is displayed on the weight display to specify medium-size characters. When the "A" key is depressed, for example, it is converted into a medium-size character code for "A".

(3) When the shift key is depressed twice, "2" is displayed on the weight display to specify small-size characters. When the "A" key is depressed, for example, it is converted into a small-size character code for "A".

FIG. 13 shows registered data printed in the three character sizes thus specified.

Figure 14:
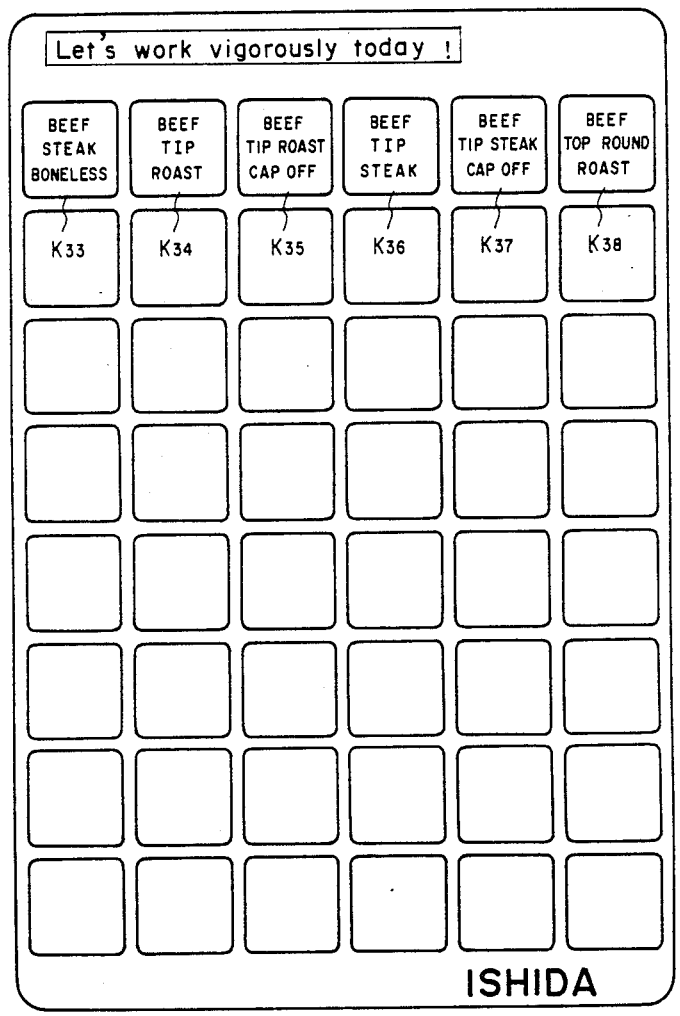
FIG. 14 illustrates a sheet to be fitted over preset keys when the preset keys are to be used as keys for calling registered data.

FIG. 14 is illustrative of a sheet to be fitted over the preset keys when they are to be used as keys for calling registered data. For example, when the key K33 is turned on and small-size characters are specified, then "STEAK BONELESS" is printed in a small size as shown in FIG. 13.

Then, the function to count and display the number of entered characters while an article name (characters) is being entered through the preset keys will be described. In performing this function, the count is incremented by +1 each time 31 character keys A, B, ... Z, ...) and ten-keys 0, 1, ... 9 are depressed, and the incremented count is displaced on the weight display. When the BACK SPACE key is turned on, the count is decreased by −1. In this manner, the operator can confirm how many characters have been entered as an article name by looking at the displayed count.

Figure 15:
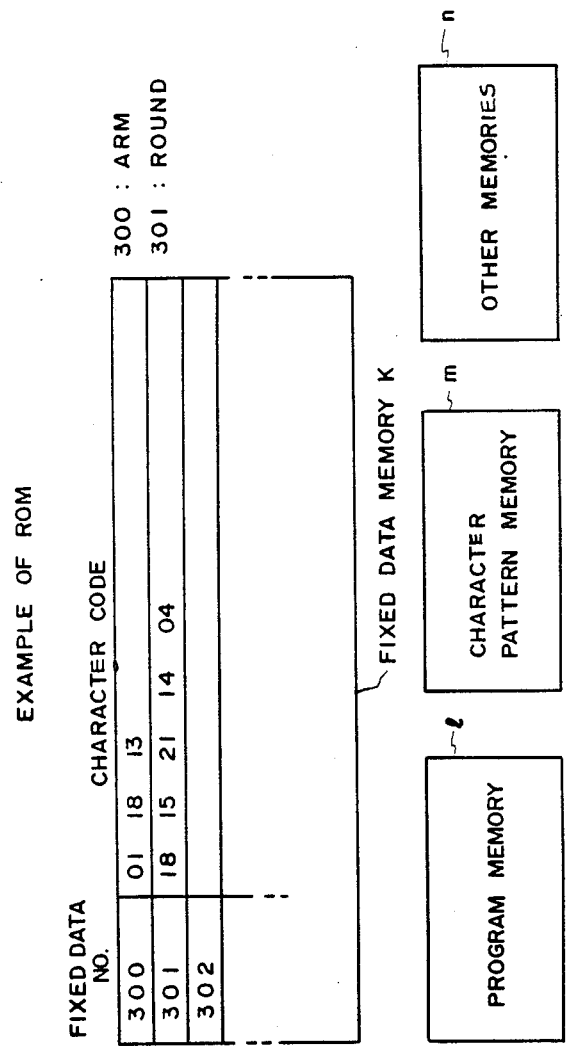
FIG. 15 illustrates the construction of a ROM in a storage unit.

Registration of words and phases through the special keys for "[","]" will be described. Characters, words, phrases, and sentences which are not found on the preset keys are stored in a ROM in the storage unit in association with fixed data numbers (for example, 300s). FIG. 15 shows an example in which "ARM" is stored at a fixed data number 300, and "ROUND" is stored at a fixed data number 301. When "ROUND" is desired to be used as part of an article name, the keys for "[", "3", "0", "1" are depressed to register "ROUND" in the registration memory in the RAM.

Figure 16:
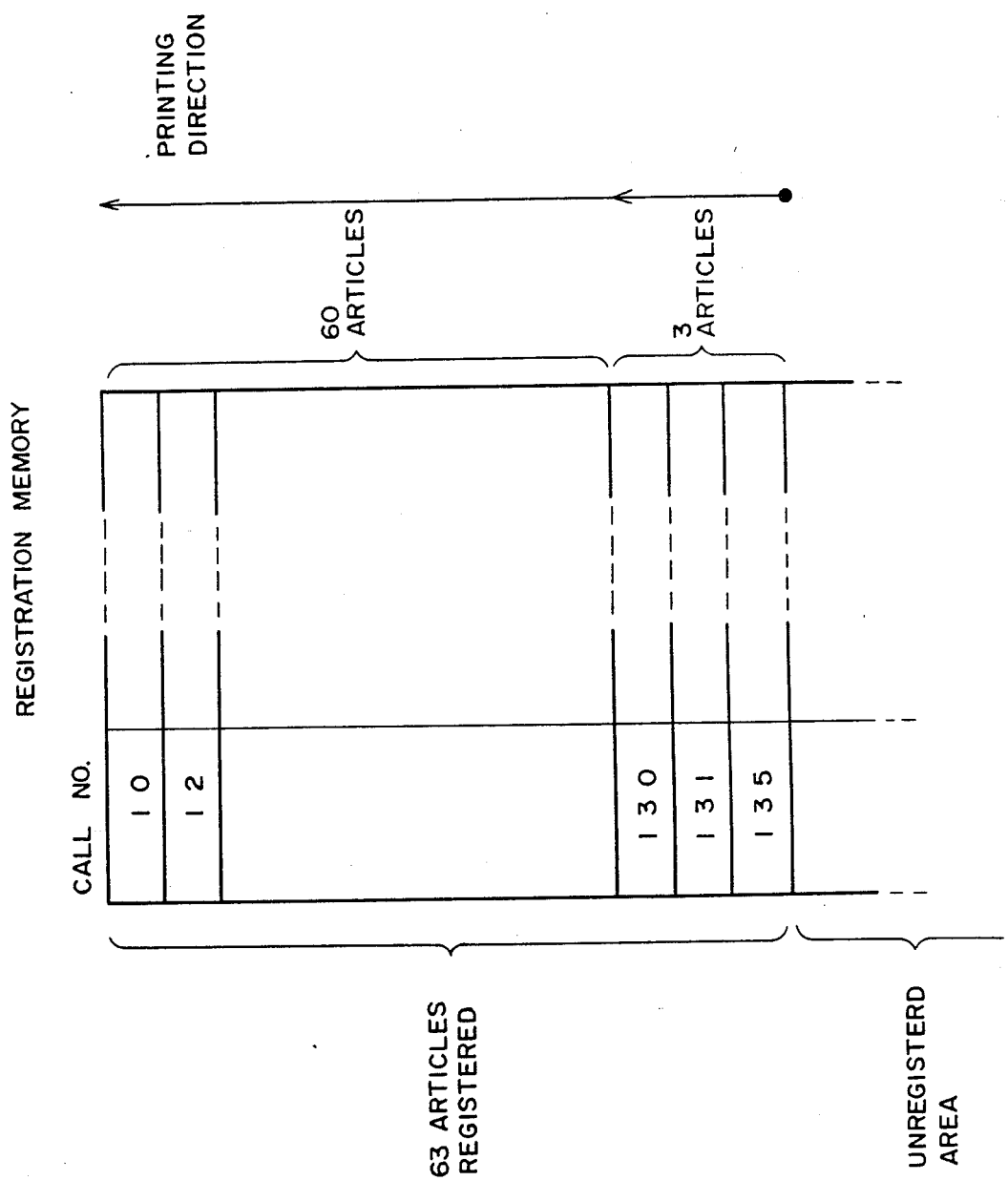
FIG. 16 is a diagram showing the sequence or direction in which data stored in the registration memory is printed.

FIG. 16 illustrates an example of a list prepared by printing registered data in the order of call numbers. The registration memory stores registered data on articles in the order of call numbers (from smaller to larger), the data including the call number, the article code, the article name, the unit price, the tare, the effective term, the fixed value, the number of figure positions for printing bar codes, and others, and the registered data is printed on a continuous sheet in the order of call numbers (from larger to smaller).

(1) Where the electronic scale has a receipt printer, registered data are successively printed on a receipt sheet.

(2) Where the electronic scale has a label printer, labels are inserted in place of a continuous sheet, for printing data thereon.

Figure 17:
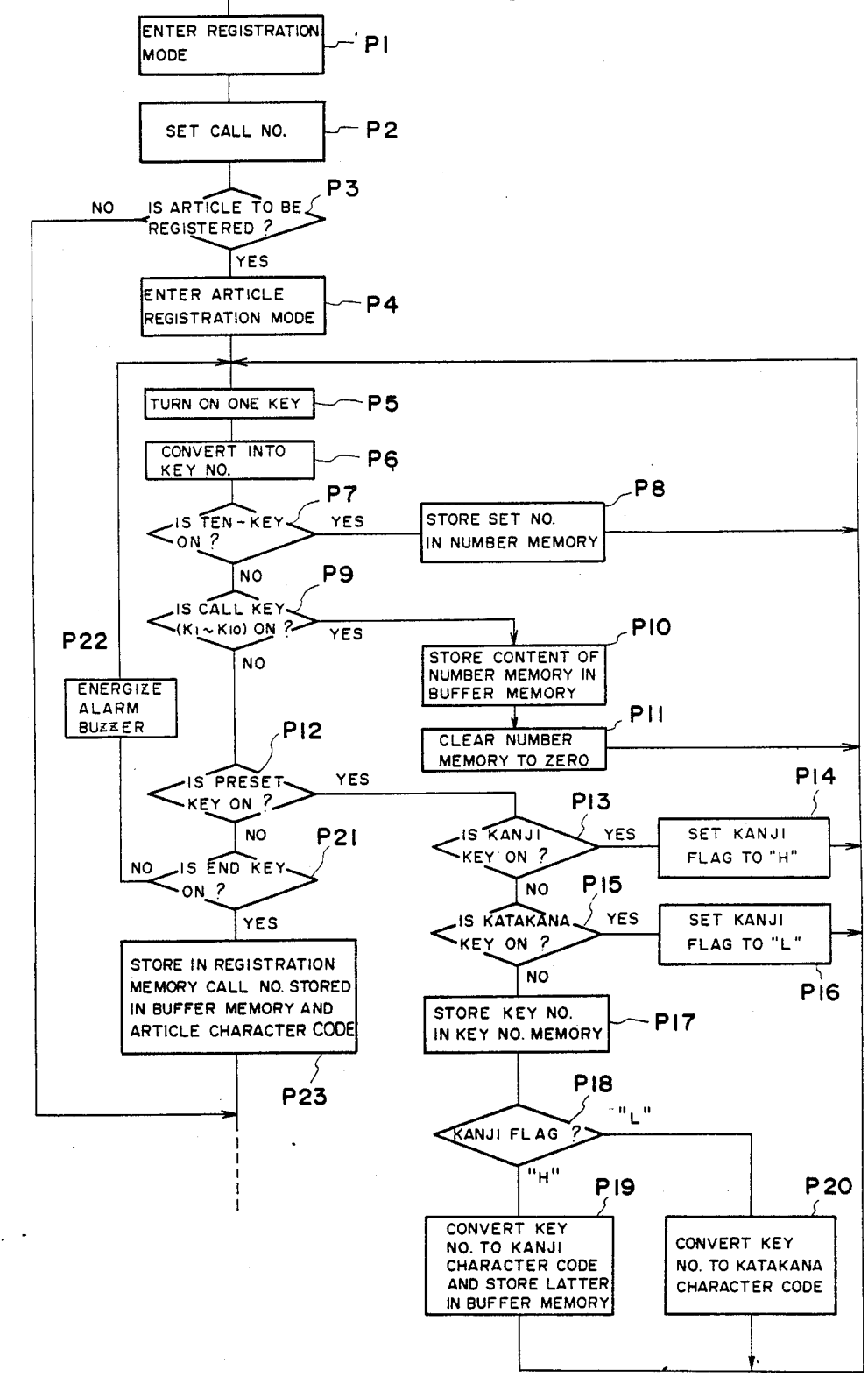
FIGS. 17 and 18 are flowcharts showing steps of operation of an electronic scale of the present invention.
Figure 18:
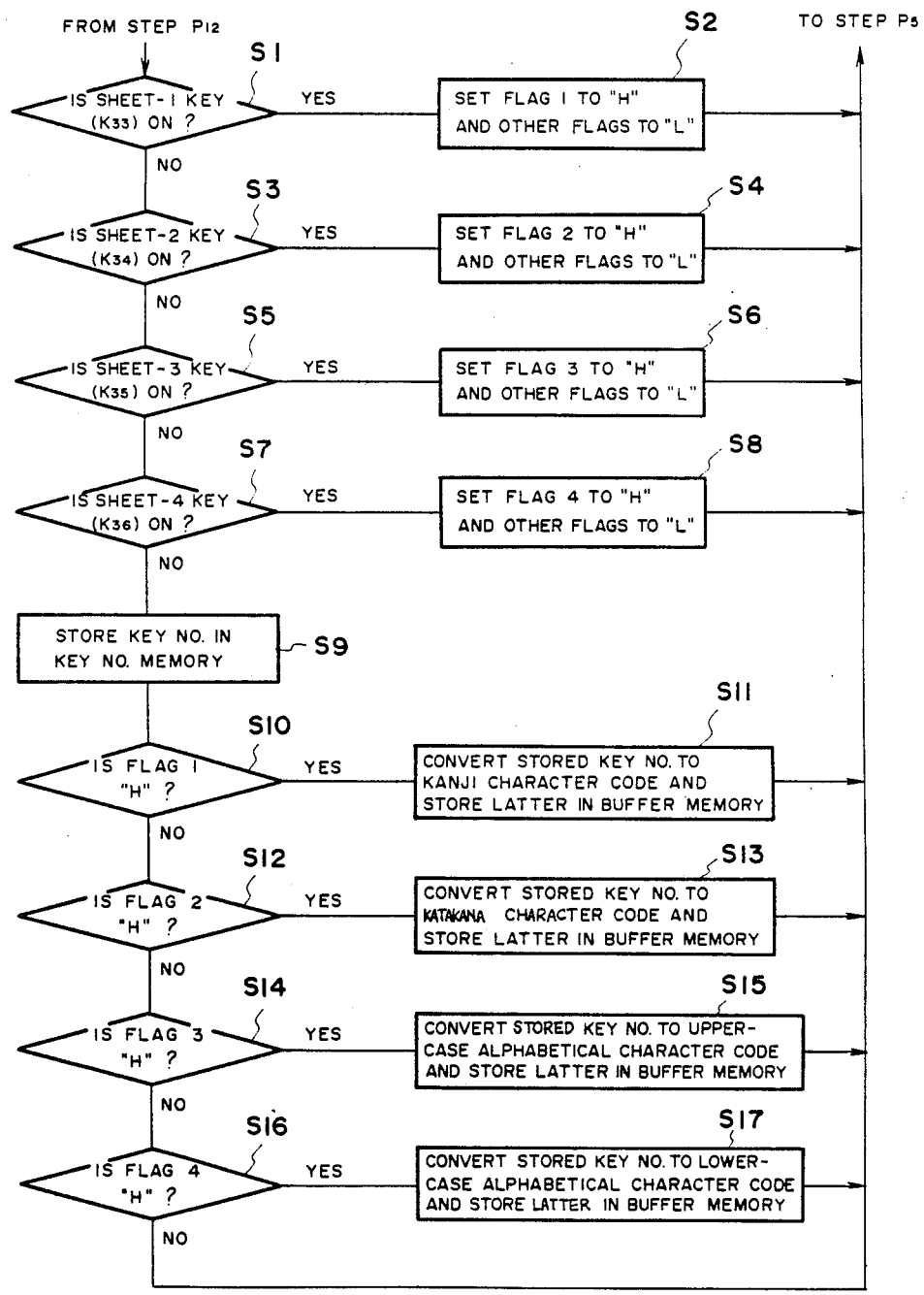

FIGS. 17 and 18 are flowcharts of processing procedures according to a first embodiment of the present invention. The flowchart of FIG. 17 is illustrative of the processing procedure in which the sheet of FIG. 5 is fitted over the preset keys 6 and article names are registered through the ten-keys or preset keys. The procedure will hereinafter be described.

(1) The arithmetic control unit 10 is entered into a registration mode, and a call number is entered through the ten-keys so as to be stored and set in the buffer memory in the storage unit 11. Where an article name is to be registered, the arithmetic control unit 10 is entered into an article name registration mode (steps P1 through P4).

(2) When one of ten-keys, the function keys, or the preset keys is turned on, it is converted into a corresponding key number by an encoder circuit in the key input unit 7. The arithmetic control unit 10 checks this key number to determine whether the ten-keys (key numbers K1 through K10) are turn on (steps P5 through P7). If the ten-keys are turned on, the arithmetic control unit 10 stores the number entered by the ten-keys, that is, the article name character code, into a number memory in the storage unit 11 (step P8).

(3) If it is determined at step P7 that no ten-keys are turned on, the artithmetic control unit 10 then determines whether the call key among the function keys is turned on or not (step P9). If the call key is turned on, then the arithmetic control unit 10 stores the content of the number memory into the buffer memory in the storage unit 11, and clears the number memory to zero (steps P10, P11).

(4) If no call key is turned on in the step p9, the program goes to a step P12 in which the arithmetic control unit 10 determines whether the preset keys are turned on or not. Then, the arithmetic control unit 10 determines whether the Kanji Key K33 is depressed or not. If the Kanji key is turned on, then the arithmetic control unit 10 sets a Kanji flag to "H" (steps P13, P14). If the Kanji key is not turned on, the arithmetic control unit 10 determines whether the Katakana key K34 is turned on or not. If the Katakana key is turned on, then the arithmetic control unit 10 sets the Kanji flag to "L" (steps P15, P16). If the Katakana key is not turned on, then the arithmetic control unit 10 stores the key number converted in step P6, that is, the key number of any one of the keys K35 through K87, into a key number memory in step P17. Thereafter, the arithmetic control unit 10 checks whether the Kanji flag is "H" is "L" in a step P18. If the Kanji flag is "H", then the arithmetic control unit 10 converts the key number into a Kanji character code which is stored in the buffer memory (step P19). If the Kanji flag is "L", then the arithmetic control unit 10 converts the key number into a Katakana character code which is stored in the buffer memory (step P20).

(5) If the preset keys are not turned on in the step P12, then the arithmetic control unit 10 checks whether an end key among the function keys is turned on or not in a step P21. If the end key is not turned on, an alarm buzzer is energized (step p22). If the end key is turned on, then the arithmetic control unit 10 stores the call number and the article name character code stored in the buffer memory into the registration memory.

FIG. 18 is illustrative of a processing flow at the time the sheets of FIGS. 7 through 10 are used, the flow corresponding to the steps P13 through P20 in the flowchart of FIG. 17.

(1) If the preset keys 6 are turned on in the step P12, the arithmetic control unit 10 checks in a step S1 whether the key K33 for the sheet 1 of FIG. 7 is turned on or not. If the sheet-1 key is turned on, then the arithmetic control unit sets a flag 1 to "H" in a step S2 and sets other flags to "L". Likewise, the arithmetic control unit 10 checks whether the keys K34, K35, K36 for the sheets 2, 3, 4, respectively, are turned on or not in steps S3, S5, S7, and sets the corresponding flag 2, 3, or 4 to "H" and other flags to "L", dependent on the sheets (steps S4, S6, S8).

(2) In a step S9, the arithmetic control unit 10 stores key numbers K37 through K87 other than the key numbers K33 through K36 corresponding to the sheets 1 through 4 into the key number memory.

(3) Then, the arithmetic control unit 10 checks whether the flat 1 is "H" or not in a step S10. If the flag 1 is "H", then the arithmetic control unit 10 converts the stored key number into a Kanji character code which is stored in the buffer memory (step S11). If the flag 2 is "H", then the arithmetic control unit 10 converts the stored key number into a Katakana character code which is stored in the buffer memory (steps S12, S13). Likewise, if the flag 3 is "H", then the arithmetic control unit converts the stored key number into an upper-case alphabetical letter code which is stored in the buffer memory (steps S14, S15). If the flag 4 is "H", then the arithmetic control unit converts the stored key number into a lower-case alphabetical letter code which is stored in the buffer memory (steps S16, S17). The preset keys can register a message such as a special bargain day in addition to the article name character.

Figure 19:
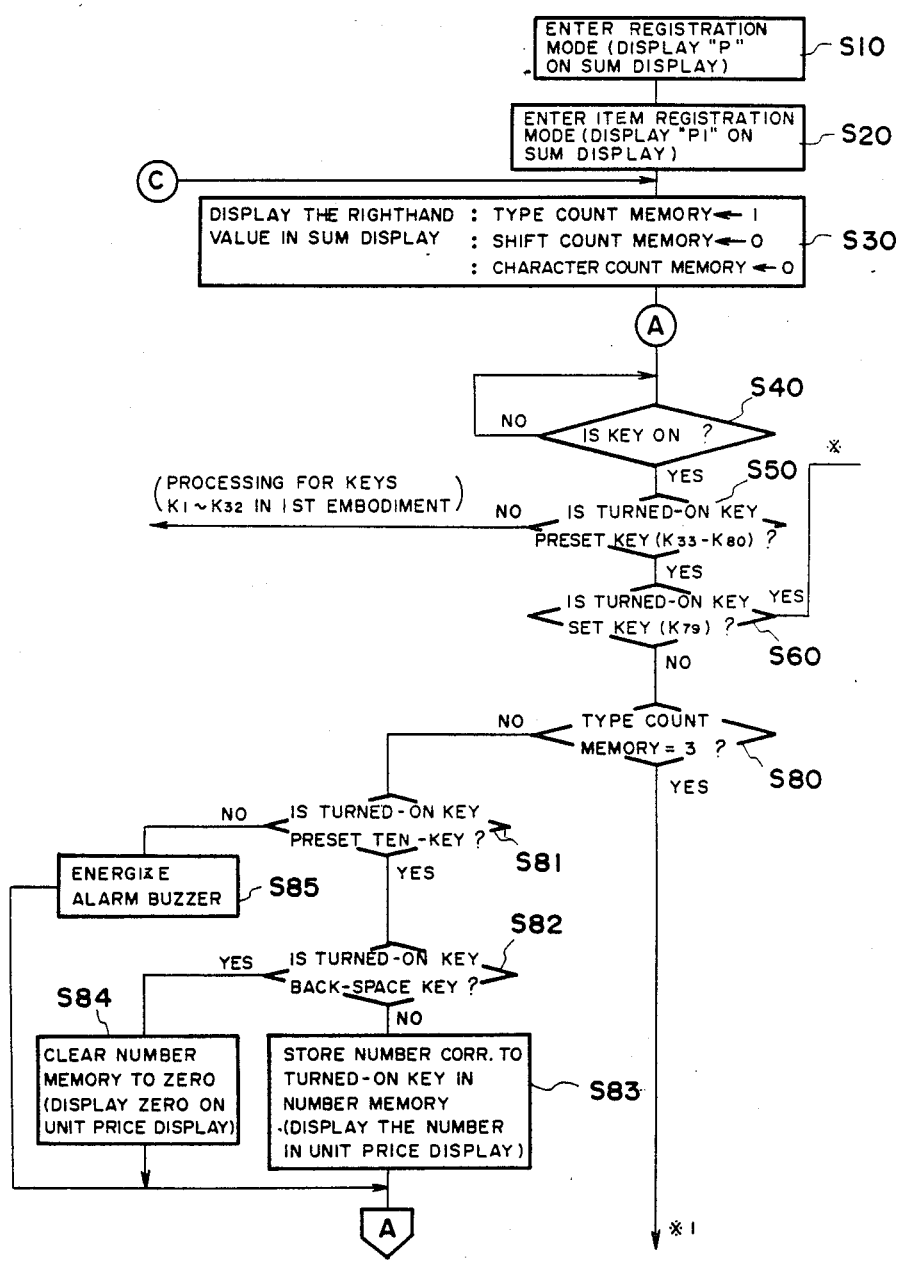
FIGS. 19(A)–(E) and 20(A) and (B) are flowcharts showing steps of operation of an electronic scale according to another embodiment of the present invention.
Figure 19:
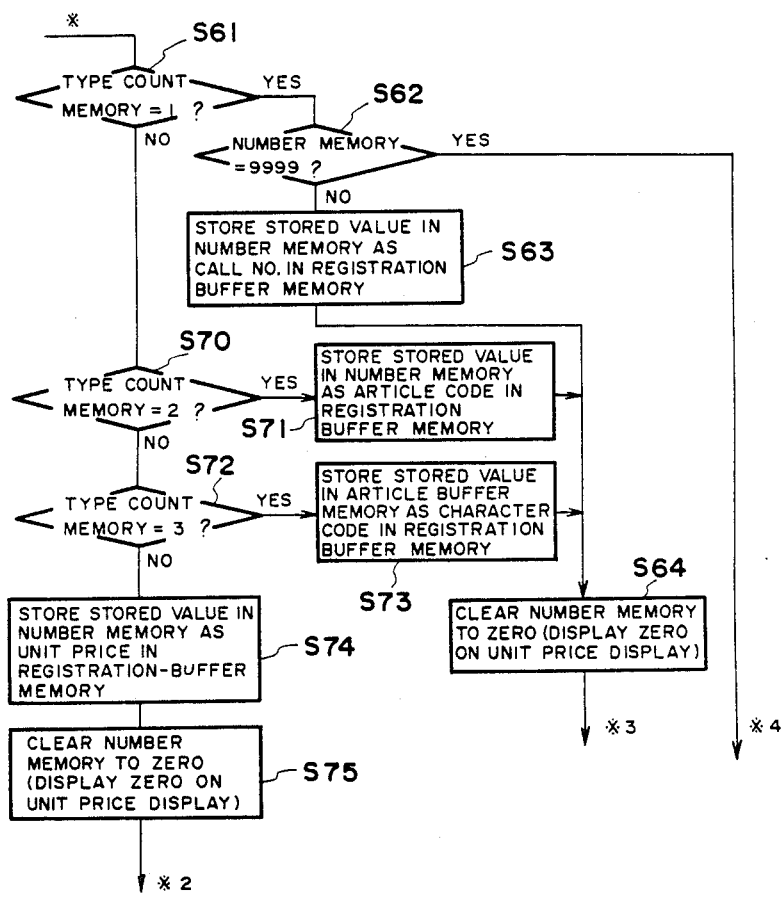
Figure 19D:
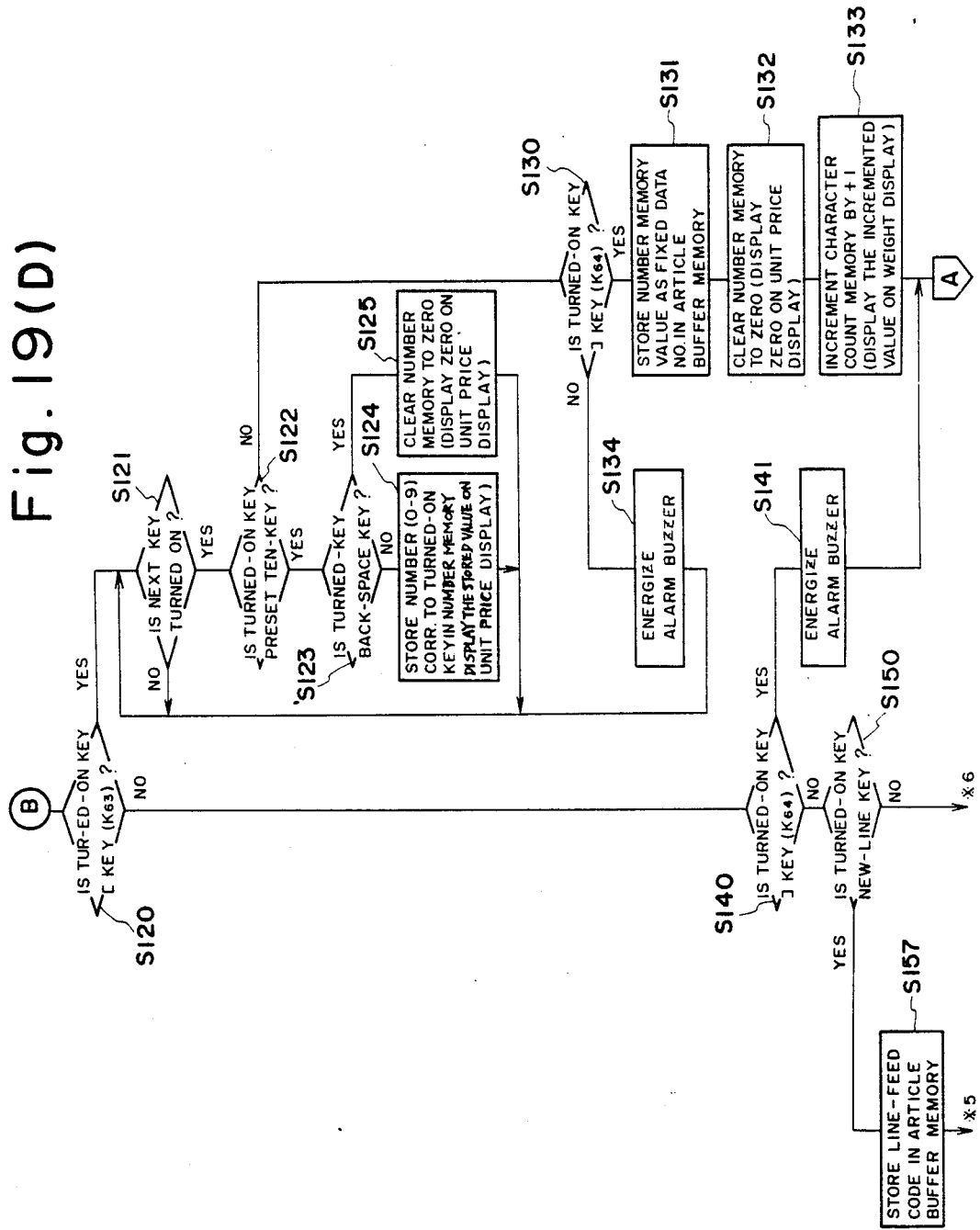
Figure 19E:
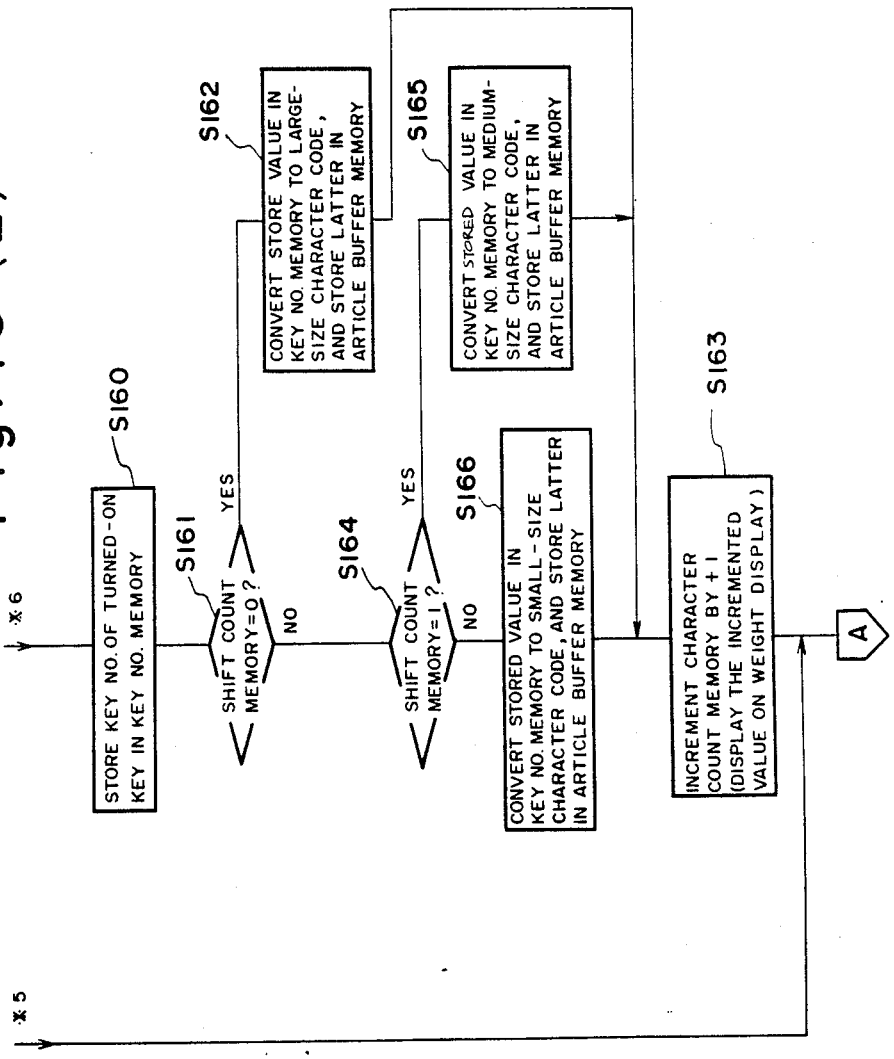
Figure 20:
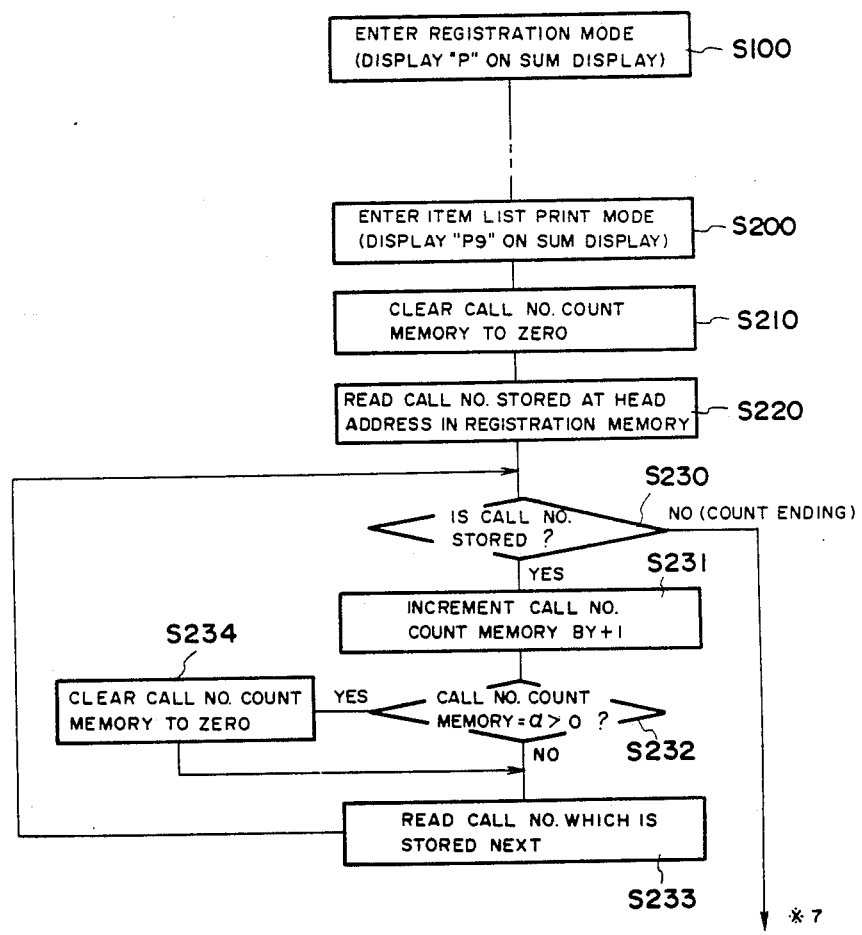
Figure 20:
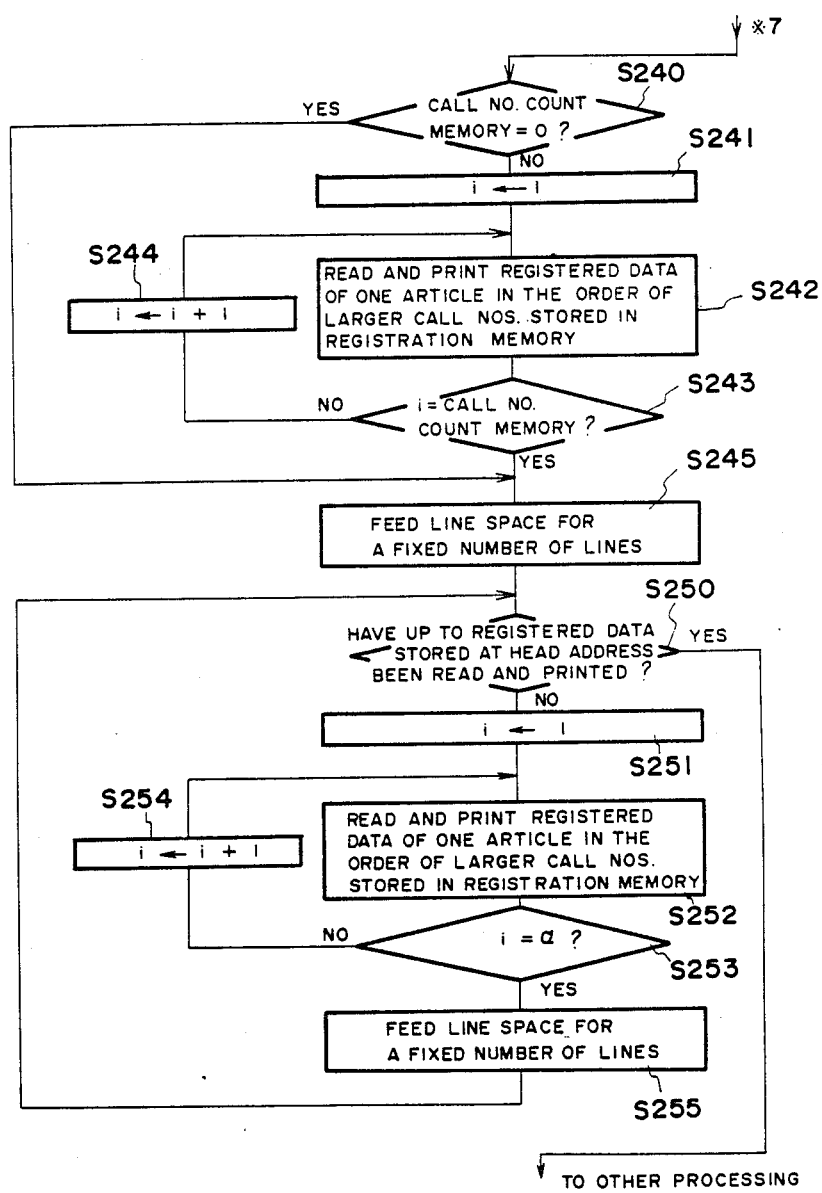

FIGS. 19 and 20 are flowcharts showing steps of operation according to another embodiment of the present invention. The flowchart of FIG. 20 is followed when registering data using the preset keys. For this operation, the following items are stored in memories in a RAM, an example of which is shown in FIG. 21.

(1) Registration memory a:
Article codes and article name character codes are stored for respective call numbers.
(2) Type count memory b:
  [1] Call number
  [2] Article code
  [3] Article name
  [4] Unit price
  [5] Tare, effective term, fixed value, figure number for printing bar codes, as desired.
(3) Shift count memory c:
  [1]"0", Large-size character
  [2]"1", Medium-size character
  [3]"2", small-size character
(4) Character count memory d:
  Count indicating the number of characters
(5) Call number count memory e:
  Call numbers from 1 through 9998
(6) Article name buffer memory f:
  Character code
(7) Registration buffer memory g:
  Temporary storage of the items [1] through [5] stored in the type count memory
(8) Number memory b:
  0 through 9 stored
(9) Key number memory i:
  Character key numbers The flowchart will now be described.

(1) A registration mode is entered, and "P" is displayed on a sum display as shwon in FIG. 12 (step S10). Then, an item registration mode is entered to display "P1" on the sum display (step S20). "1" is stored in a type count memory and displayed on the sum display, and "0" is stored in a shift count memory and a character count memory (step S30).

(2) Depression of the preset keys is confirmed. Where the stored value in the type count memory is other than 3, that is, for the call number, the article code, and the unit price, and when the turned-on key is other than the BACK SPACE key among the preset ten-keys, then a numeral ranging from 0 to 9 corresponding to the turned-on key is stored in the number memory, and the stored value is displayed on the unit price display (steps S50, S60, and S80 through S83). If the BACK SPACE key is turned on, the number memory is cleared to zero, and "0" is displayed on the unit price display (step S84).

(3) If the turned-on key is a SET key, (step S60), then the following processing is followed:

[1] If the stored value in the type count memory is 1, that is, for the call number (step S61), when the stored value in the number memory is 9999 (step S62), then the number memory is cleared to zero, and "0" is displayed on the unit price display (step S66), and the item registration mode is released (step S67).

[2] If the stored value in the type count memory is 1 when the stored value in the number memory is not 9999, then the stored value in the number memory is registered as a call number and stored in the buffer memory (step S63). Then, the number memory is cleared to zero and "0" is displayed on the unit price display (step S64). The stored value in the type count memory is incremented by +1, and the incremented value is displayed on the sum memory (step S65).

[3] If the stored value in the type count memory is 2 when the stored value in the type count memory is not 1 (step S70), then the stored value in the number memory is registered as an article code and stored in the registration buffer memory (step S71). If the stored value in the type count memory is 3 (step S72), then the stored value in the article name buffer memory is registered as a character code and stored in the registration buffer memory (step S73).

[4] When the stored value in the type count memory is not 1 through 3, then the stored value in the number memory is stored as a unit price in the registration buffer memory (step S74), and th number memory is cleared to zero, with "0" displayed on the unit price displayed (step S75). Then, the call numbers stored in the registration memory are searched, and all registered data having call numbers larger than the call number stored in the registration buffer memory are shifted, during which time the content stored in the registration buffer memory is stored. Therefore, the registration memory always stores registered data in the order of call numbers (from smaller to larger) (step S76) as indicated in the example of FIG. 16.

(4) When the stored value in the type count memory is 3, that is, for registering an article name, then the following process is effected:

[1] If the turned-on key is the SHIFT key (step S90), the shift count memory is incremented by +1 (step S91), and after the stored value in the shift count memory has been confirmed as being 3, the shift count memory is cleared to zero (step S93). If the stored value in the shift count memory is not 3, the stored value in the shift count memory is displayed on the weight display (step S94).

[2] If the turned-on key is the BACK SPACE key when the turned-on key is not the SHIFT key (step S100), then the final data among those stored in the article name buffer memory is cleared, and a space code is stored (step S101). Then, the stored value in the character count memory is decreased by −1, and the decreased value is displayed on the weight display (step S102).

If the turned-on key is an SP key (step S110), then the space code is stored in the article name buffer memory (step S111), and the character count memory is incremented by +1, with the incremented value displayed on the weight display (step S112).

[3] If the turned-on key is a "[" key (step S120), then the following process is carried out:

(a) If the next turned-on key is a preset ten-key which is not the BACK SPACE key, then a numeral (ranging from 0 to 9) corresponding to the turned-on key is stored in the number memory and displayed on the unit price display (steps S121 through S124). If the BACK SPACE key is turned on at this time, then the number memory is cleared to zero, and "0" is displayed on the unit price display (step S125).

(b) If the turned-on key is neither a preset ten-key (step S122) nor a "]" key (step S130), then the alarm buzzer is actuated (step S134), and the program returns to the step S121.

If the turned-on key is the "]" key, then the stored value in the number memory is stored as a fixed data number in the article name buffer memory (step S131).

The fixed data number is employed for storing a character, a word, a phrase, or a sentence which is not present on the preset keys. By registering the data with the fixed data number, the word or the like can automatically be fetched and printed when the fixed data nubmer is called.

Then, the number memory is cleared to zero, "0" is displayed on the unit price display (step S132, the character count memory is incremented by +1, and the incremented value is displayed on the weight display (step S133).

(c) If the turned-on key is the "]" key (step S140), then the alarm buzzer is energized (step S141).

(d) If the turned-on key is the NEW LINE key (step S150), then a line-feed code is stored in the article name buffer memory (step S151).

(e) If the turned-on key is one of the A, B, ... Z, 0, 1, ... 9, &, %, —, (, and 0 keys, that is, is not the SHIFT key (step S90), the BACK SPACE key (step S100), the SP key (step S110), the "[" key (step S120), the "]" key (step S140), or the NEW LINE key (step S150), then the key number of the turned-on key is stored in the key number memory (steps 160), and it is determined whether the stored value in the shift count memory is 0 or not. If the stored value in the shift count memory is 0 (step S161), then the stored value in the key number memory is converted into a large-size character code which is stored in the article name buffer memory (step S162). If the turned-on key is the key K33 for "A", for example, then 33 is converted into a large-size character code for "A".

If the stored value in the shift count memory is 1 (step S164), then the stored value in the key number memory is converted into a medium-size character code which is stored in the article name buffer memory (step S165).

If the stored value in the shift count memory is neither 0 nor 1, then the stored value in the shift count memory if 2. Therefore, the stored value in the key number memory is converted into a small-size character code which is stored in the article name buffer memory (step S166). The character count memory is incremented by +1, and the incremented value is displayed on the weight display (step S163).

The flowchart of FIG. 20 is illustrative of steps of an operation for successively printing registered data. Now, the flowchart of FIG. 20 will be described with reference to an example in which 63 articles are registered to call numbers 10 through 135 as shown in FIG. 16.

(1) The registration mode is entered, and "P" is displayed on the sum display (step S100). Then, an item list printing mode, and "P9" if displayed on the sum display (step S200). The call number count memory is cleared to zero (step S210), and the call number stored at a head address in the registration memory is read (step S220).

(2) The number of articles that can be printed on, for example, an A4-size sheet, is set to $\alpha$. In the example of FIG. 16, $\alpha=15$, and remainders after 15 have been multiplied by an integer, that is, three articles having call numbers 130, 131, 135 are printed at first. This process is effected as follows:

(3) With the call numbers confirmed as being stored (step S230), the call number count memory is incremented by +1 (step S231), and whether the stored value in the call number count memory is $\alpha$ or not is checked (step S232). If the above condition is met, then the call number count memory is cleared to zero (step S234). If the above condition is not met, then a call number stored next is read out (step S233). Thus, the remainders after $\alpha$ have been multiplied by an integer are counted in the steps S230 through S233.

(4) There is no call number stored upon completion of counting, the following process is carried out in order to print articles equal to the stored value in the call number count memory in the order of the call numbers (from larger call numbers). In the example of FIG. 16, the registered data of the call numbers 135, 131, 130 are printed.

If the stored value in the call number count memory is not 0, then an index i is set to 1, and registered data for one article is read out and printed in the order of the call numbers (from larger call number) stored in the registration memory (step S242). If the value of i is not equal to the stored value in the call number count memory (step S243), then 1 is added to i, and the process of the step S242 is repeated (step S244). If i is equal to the stored value in the call number count memory, the program leaves this processing loop and proceeds to a next process in which the sheet is fed for a fixed number of lines to provide a cutting margin for cutting off the printed-out sheet to an A4-size sheet (step S245).

(5) Then, the preset number of ($\alpha$) articles are printed and a cutting margin is provided by the following process:

If it is confirmed that reading and printing up to the registered data stored at the head address is not yet completed (step S250), then the index i is set to 1 (step S251), and registered data for one article is read out and printed in the order of call numbers (from larger call number) stored in the registration memory (step S252). 1 is added to i unit i=$\alpha$, and the process in the step S252 is repeated (steps S253, S254). When i=$\alpha$, then the sheet is fed for a fixed number of lines (step S255). In the example of FIG. 16, the process is repeated four times ($\alpha=15$, $15\times4=60$), so that 60 articles are printed.

FIG. 13 shows an example of a sheet printed in the above manner.

FIG. 12 illustrates a displayed example on the display unit, which will be described below.

(1) The item registration mode is entered, and "P−1" is displayed in a mode column on the sum display. To register a call number, 1 is selected as the stored value in the type count memory, and displayed on the sum display.

(2) 12 is entered as a call number, and this stored value in the number memory is displayed on the unit price display.

(3) A character "B" is entered first in order to enter BEEF ROUND as an article name. At this time, the displayed value on the weight display for the stored value in the character count memory becomes 1, and the displayed value on the sum display for the stored value in the type count emmory becomes 3 for registering the article name. The number memory is cleared to zero (see the steps S72, S73, S64).

(4) Then, the "E", "E", "F" keys and the SP key are depressed to cause the stored value in the character count memory to become 5. To store a fixed data number 301 corresponding to ROUND in the article name buffer memory, "[", "3", "0", "1" are entered to thereby display "301" on the unit price display.

(5) The "]" key is depressed to increase the stored value in the character count memory up to 6, and a line feed is effected. In order to print TIP ROAST in a small size, the NEW LINE, SHIFT, SHIFT keys are depressed. At this time, the stored value in the if count memory is displayed as 2 on the weight display, and the number memory is cleared to zero (see the steps S130, S132).

(6) For conversion into a small-size character code, the character key T is turned on to equalize the stored value in the character count memory to 7.

(7) 9999 is entered as a call number, and the SET key is depressed. The item registration mode is now released, and "P" is displayed on the sum display (see the steps S60, S62, S67).

Although certain preferred embodiments have been shown and described, it should be understood that many changes and modifications may be made therein without departing from the scope of the appended claims.

What is claimed is:

1. An electronic scale, comprising:
   a weighing unit for weighing an article and generating a weight signal corresponding to the weight of the article;
   a key input unit for generating a character code signal corresponding to the article, including an article name signal represented by one character corresponding to the article, for generating a recall signal corresponding to each character code signal, and for respectively selecting and specifying the size of characters to be printed in accordance with the name, weight and price of the article, the size capable of being different for each of the name, weight and price;
   an arithmetic control unit, operatively connected to said weighing unit and said key input unit, for computing the price of the article based on the weight signal and the character code signal, and for generating a price signal corresponding to the computed price;
   a memory for storing characters corresponding to keys included in said key input unit;
   storage means for storing the specified size of the characters;
   conversion means for converting characters stored in said memory to character codes of the specified character size;
   a storage unit, operatively connected to the arithmetic control unit, for storing article data in accordance with the character code signal;
   a display unit, operatively connected to the arithmetic control unit, for displaying characters corresponding to the weight and price of the weighed article in accordance with the weight and price signals using the character codes; and
   a printer, operatively connected to the arithmetic control unit, for printing characters of the specified size corresponding to the weight, price and name of the weighed article in accordance with the weight, price and article name signals using the character codes.

2. An electronic scale according to claim 1, wherein said key input unit includes a plurality of keys and replaceable sheets indicating article names and other items associated respectively with the positions of the keys.

3. An electronic scale according to claim 1, wherein said key input unit includes a plurality of keys, each key generating a signal, and wherein said key input unit includes means for switching the keys between a first mode for generating signals corresponding to numerals and a second mode for generating signals corresponding to numerical/characters.

4. An electronic scale according to claim 1, wherein said key input unit includes means for generating words, phases and other items.

5. An electronic scale according to claim 1, wherein each item of data entered in the storage unit has a call number associated therewith and wherein said printer includes means for printing items of data stored in said storage unit in the order of call numbers thereof.

6. An electronic scale, comprising:
   a weighing unit for weighing an article and generating a weight signal corresponding to the weight of the article;
   a key input unit for generating a character code signal corresponding to the article, including an article name signal represented by one character corresponding to the article, for generating a recall signal corresponding to each character code signal, and for respectively selecting and specifying the size of characters to be printed in accordance with the name, weight and price of the article, the size being different for each of the name, weight and price;
   an arithmetic control unit, operatively connected to said weighing unit and said key input unit, for computing the price of the article based on the weight signal and the character code signal, and for generating a price signal corresponding to the computed price;
   a memory for storing characters corresponding to keys included in said key input unit;
   storage means for storing the specified size of the characters;
   conversion means for converting characters stored in said memory to character codes of the specified character size;
   a storage unit, operatively connected to the arithmetic control unit, for storing article data in accordance with the character code signal;
   a display unit, operatively connected to the arithmetic control unit, for displaying characters corresponding to the weight and price of the weighed article in accordance with the weight and price signals using the character codes, said disply unit including means for counting and displaying the number of entered characters while an article name signal is being generated by said key input unit; and
   a printer, operatively connected to the arithmetic control unit, for printing characters of the specified size corresponding to the weight, price and name of the weighed article in accordance with the weight, price and article name signals using the character codes.

* * * * *

UNITED STATES PATENT AND TRADEMARK OFFICE
CERTIFICATE OF CORRECTION

PATENT NO. : 4,693,329

DATED : Sep. 15, 1987

INVENTOR(S) : HIKITA

It is certified that error appears in the above-identified patent and that said Letters Patent is hereby corrected as shown below:

FRONT PAGE
[54] Delete "Electonic" and insert --Electronic--.

<u>Col. 1</u>
Line 1, delete "Electonic" and insert --Electronic--;
Line 28, delete "for";
Line 45, delete "cles" and insert --cle--.

<u>Col. 2</u>
Line 36, delete "are";
Line 40, after "to" insert --enter--;
       delete "means" and insert --names--.
Line 62, delete "displayed" and insert --display--.

<u>Col. 3</u>
Line 19, delete "1," and insert --1;--.

<u>Col. 4</u>
Line 16, delete "shet" and insert --sheet--;
Line 59, no paragraph;
Line 60, after "Thus," insert --by--;
Line 65, delete "display" and insert --display,--.

UNITED STATES PATENT AND TRADEMARK OFFICE
CERTIFICATE OF CORRECTION

PATENT NO. : 4,693,329
DATED : Sep. 15, 1987
INVENTOR(S) : HIKITA

It is certified that error appears in the above-identified patent and that said Letters Patent is hereby corrected as shown below:

Col. 6
Line 22, delete "p9" and insert --P9--;
Line 50, delete "p22" and insert --P22--.

Col. 7
Line 6, delete "flat" and insert --flag--;
Line 51, delete "b" and insert --h--.

Col. 8
Line 36, delete "th" and insert --the--.

Col. 9
Line 25, delete "nubmer" and insert --number--;
Line 27, delete "S132," and insert --S132)--;
Line 57, delete "if" and insert --is--.

Col. 11
Line 6, delete "emmory" and insert --memory--;
Line 18, delete "if" and insert --shift--.

Signed and Sealed this

Twelfth Day of April, 1988

Attest:

DONALD J. QUIGG

Attesting Officer  Commissioner of Patents and Trademarks